United States Patent
Valkó et al.

(10) Patent No.: US 9,020,490 B2
(45) Date of Patent: Apr. 28, 2015

(54) METHOD AND APPARATUS FOR CACHING (71) Applicant: Telefonaktiebolaget L M Ericsson (Publ), Stockholm (SE)

(72) Inventors: Andras Valkó, Hässelby (SE); Catalin Meirosu, Stockholm (SE); Zoltán Turányi, Szentendre (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 231 days.

(21) Appl. No.: 13/705,730

(22) Filed: Dec. 5, 2012

(65) Prior Publication Data

US 2013/0150015 A1 Jun. 13, 2013

Related U.S. Application Data (60) Provisional application No. 61/569,943, filed on Dec. 13, 2011.

(30) Foreign Application Priority Data

Dec. 13, 2011 (EP) .................................... 11193276

(51) Int. Cl.
*H04M 3/00* (2006.01)
*H04W 8/24* (2009.01)
(Continued)

(52) U.S. Cl.
CPC ............. *H04W 8/245* (2013.01); *H04W 56/00* (2013.01); *G06F 2212/174* (2013.01); *G06F 12/0862* (2013.01); *G06F 2212/171* (2013.01); *G06F 2212/464* (2013.01); *H04L 67/2847* (2013.01)

(58) Field of Classification Search
CPC ............ G06F 17/30902; G06F 9/5055; G06F 12/0866; H04L 12/189; H04W 28/12; H04W 8/24; H04W 8/245; H04W 56/00; Y10S 707/967; H04N 21/2183
USPC .................. 709/213, 231, 232; 711/158, 138; 725/92, 94, 115, 145; 455/418, 419, 455/558; 707/10, 102, 769
See application file for complete search history.

(56) References Cited

U.S. PATENT DOCUMENTS 6,467,028 B1 * 10/2002 Kelley ........................... 711/129
6,631,451 B2 * 10/2003 Glance et al. ................. 711/158
(Continued)

FOREIGN PATENT DOCUMENTS

WO WO 2011/075019 A1 6/2011

OTHER PUBLICATIONS

Abhari, et al. Workload generation for YouTube. Published Online: Jun. 18, 2009. Springer Science + Business Media, LLC 2009.
(Continued)

*Primary Examiner* — Olumide T Ajibade Akonai (57) ABSTRACT

A method and caching server for enabling caching of a portion of a media file in a User Equipment (UE) in a mobile telecommunications network. The caching server selects the media file and determines a size of the portion to be cached in the UE. The size may be determined depending on radio network conditions for the UE and/or characteristics of the media file. The caching server sends an instruction to the UE to cache the determined size of the portion of the media file in the UE.

13 Claims, 7 Drawing Sheets

(51) Int. Cl.
*G06F 12/08* (2006.01)
*H04L 29/08* (2006.01)
*H04W 56/00* (2009.01)

(56) References Cited

U.S. PATENT DOCUMENTS

| | | | |
|---|---|---|---|
| 7,028,096 B1* | 4/2006 | Lee | 709/231 |
| 7,697,425 B2* | 4/2010 | Bazin et al. | 370/230 |
| 8,078,729 B2* | 12/2011 | Kozat et al. | 709/226 |
| 2005/0132049 A1* | 6/2005 | Inoue et al. | 709/225 |
| 2009/0125634 A1* | 5/2009 | Virdi et al. | 709/231 |
| 2012/0158770 A1* | 6/2012 | Benadjaoud et al. | 707/769 |

OTHER PUBLICATIONS

3GPP. 3rd Generation Partnership Project; Technical Specification Group Radio Access Network; Evolved Universal Terrestrial Radio Access (E-UTRA); Requirements for Support of Radio Resource Management (Release 10). 3GPP TS 36.133 v10.0.0. Oct. 2010.

3GPP. 3rd Generation Partnership Project; Technical Specification Group Radio Access Network; Requirements for Support of Radio Resource Management (TDD) (Release 9). 3GPP TS 25.123 v9.3.0. Sep. 2010.

3GPP. 3rd Generation Partnership Project; Technical Specification Group Radio Access Network; Requirements for Support of Radio Resource Management (FDD) (Release 9). 3GPP TS 25.133 v9.5.0. Sep. 2010.

* cited by examiner

| Media file | Priority |
|---|---|
| File #1 | 100 |
| File #2 | 50 |
| | |
| File #n | 40 |

Fig. 4

| Media file | cache status | | |
| --- | --- | --- | --- |
| | Start time | End time | Size |
| File #1 | 0 sec | T_1 sec | 10 |
| File #2 | | | |
| ... | | | |
| File #n | | | |

UE id = 110

UE id = yyy

UE id = zzz

METHOD AND APPARATUS FOR CACHING

CROSS-REFERENCE TO RELATED APPLICATIONS

This application claims the priority benefit under 35 U.S.C. §119(e) of U.S. Provisional Application No. 61/569,943 filed on Dec. 13, 2011, the disclosure of which is incorporated herein by reference in its entirety.

TECHNICAL FIELD

The present invention relates to a method and an apparatus for caching and in particular to a method and an apparatus for enabling caching of a portion of a media file in a User Equipment (UE).

BACKGROUND

The evolution of terminals such as tablets, computers, smart phones, game consoles, personal digital assistants, and the like resulted in the possibility to consume video or audio content.

Progressive download is a way to download desired content from a server to a client. The client may be implemented in a mobile terminal, hereinafter referred to as a User Equipment (UE). Using progressive download, a client application running on the UE can start playback of the desired content before the entire content is downloaded. When the download starts, the client application stores the beginning of the desired content, such as a media file, in a playout buffer. This phase is called initial buffering. A media file refers to any audio or video file.

When the playout buffer contains a certain amount of the desired content, e.g. the first few seconds, the client application can start playback, while at the same time it continues to download the remaining of the desired content into the playout buffer. If the download speed is high enough, the download is "ahead" of the playback, and hence the user experiences a continuous media experience.

However, the need for initial buffering results in a waiting time when the user starts to view the desired content. The waiting time impacts the user's perceived service quality.

Caching media is a well-known technique for improving access times and optimizing bandwidth usage in telecommunication or enterprise networks. A cache uses a block of memory, or disk space, or other storage device to temporarily store a copy of some content that is likely to be needed in the future. A way to improve caching efficiency is to use prefetching. Prefetching is a technique that downloads content to a cache in e.g. a UE in advance of it being accessed. See, as an example, the published patent application WO 2011/075019 A1, which concerns prefetching of content and discusses a way to predict what content a user will be interested in, and then prefetch it to his/her UE. The prediction is based on user preferences, history etc.

The article "Workload generation for YouTube", by Abdolreza Abhari and Mojgan Soraya, discusses partial caching of YouTube video files as a way to improve cache performance and video playback time. A five second beginning part, required for buffering purposes, for each video is cached in a proxy cache. The work presented by the article is related to a simulation scenario where the authors have developed a YouTube synthetic workload generator for evaluating the performance of caching or peer-to-peer (P2P) content delivery architectures for YouTube. The article also refers to related work wherein peers in a P2P system, based on social network, are re-distributing the videos that they have cached. A prefetching strategy is used to prefetch a five second beginning part of the next video in the related social network in each peer in order to decrease the start up delay of P2P overlay.

A drawback with prefetching of content is that it consumes a large amount of resources, since the caching is performed before the content is actually accessed. Additionally, if the caching is based on a prediction of which content will need to be accessed, significant capacity is wasted, unless the prediction is very accurate, and the hit rate is very high. This is especially the case when prefetching content to a UE connected to a wireless access network, such as a radio access network in a mobile telecommunications network. To prefetch a beginning part of content, as described in the above cited article, is a step in the direction of improving the technique of prefetching. There is however still a need for solutions that further improves the techniques of caching content to a UE, especially when the UE is connected to a wireless access network, and the caching is performed in advance of the content being accessed.

SUMMARY

It is an object of the invention to provide a method and apparatus for caching, which at least partly overcome some of the above mentioned limitations and challenges associated with prefetching, i.e. to caching content in advance of it being accessed. This object is achieved by means of a methods and an apparatus according to the attached independent claims.

According to different aspects, embodiments of methods and apparatuses are provided for enabling caching of a portion of a media file.

According to one aspect, a method, performed by a caching server of a mobile telecommunications network, is provided for enabling caching of a portion of a media file in a User Equipment (UE). The caching server selects the media file of which the portion is to be cached in the UE. The caching server determines a size of the portion of the media file to be cached. The size is determined depending on radio network conditions for the UE and/or characteristics of the media file. The caching server sends an instruction to the UE to cache the determined size of the portion of the media file in the UE.

Furthermore, a caching server is provided for enabling caching of the portion of the media file in the UE. The caching server comprises a receiver, a transmitter, a memory and processing logic. The processing logic is connected to the receiver, to the transmitter and to the memory. The processing logic is configured to select the media file of which the portion is to be cached in the UE. The processing logic is further configured to determine the size of the portion of the media file to be cached. The size is determined depending on radio network conditions for the UE and/or characteristics of the media file. The transmitter is configured to send the instruction to the UE to cache the determined size of the portion of the media file in the UE.

Further features and benefits of embodiments of the invention will become apparent from the detailed description below.

BRIEF DESCRIPTION OF THE DRAWINGS

In the following section, the invention will be described with reference to exemplary embodiments illustrated in the figures, in which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of software stored on a non-transitory memory and executed by a general purpose computer or microprocessor.

It has been discussed above that prefetching a beginning part of content, such as media files, may improve cache performance and video playback time.

A possible solution for improving the user's perceived service quality while viewing desired content, such as media files, in a UE, is that a beginning part or portion of the media file is cached to the UE, in advance of it being accessed. The cached portion may then be used as an initial buffer when the user starts playing the media file. This may reduce or eliminate the waiting time at initial buffering and may thus improve the user experience.

However, irrespective of if it is the full media file or only a portion that is cached to the UE still a lot of resources are consumed, since the caching is being performed before the media file is actually accessed. Consequently, it is not guaranteed that the particular media file will ever be accessed by the user of the UE. Even if the caching is based on a, possibly sophisticated, prediction of which content will need to be accessed, it is not sure that the media file will be accessed, unless the prediction is very accurate, and the hit rate is very high.

Briefly described, a solution is provided for enabling an effective way of caching a portion of a media file in a UE in a situation when the UE is connected to a wireless access network, such as a radio access network in a mobile telecommunications network. A caching server of the mobile telecommunications network selects a media file of which a portion is to be cached in the UE. The caching server then determines a size of the portion of the media file to be cached. The size is determined depending on radio network conditions for the UE and/or characteristics of the media file. The UE is then instructed by the caching server to cache the determined size of the portion of the media file in the UE.

By caching the portion of the media file in a size that is determined depending on radio network conditions and/or characteristics of the media file, it is possible to adapt the cached portion to different circumstances that may influence the transmission capacity. This saves resources both in the network and in the UE, especially in a situation when the caching of the portion of the media file is being performed before the media file is actually accessed by the user of the UE. Consequently, the solution improves prefetching.

Figure 1:
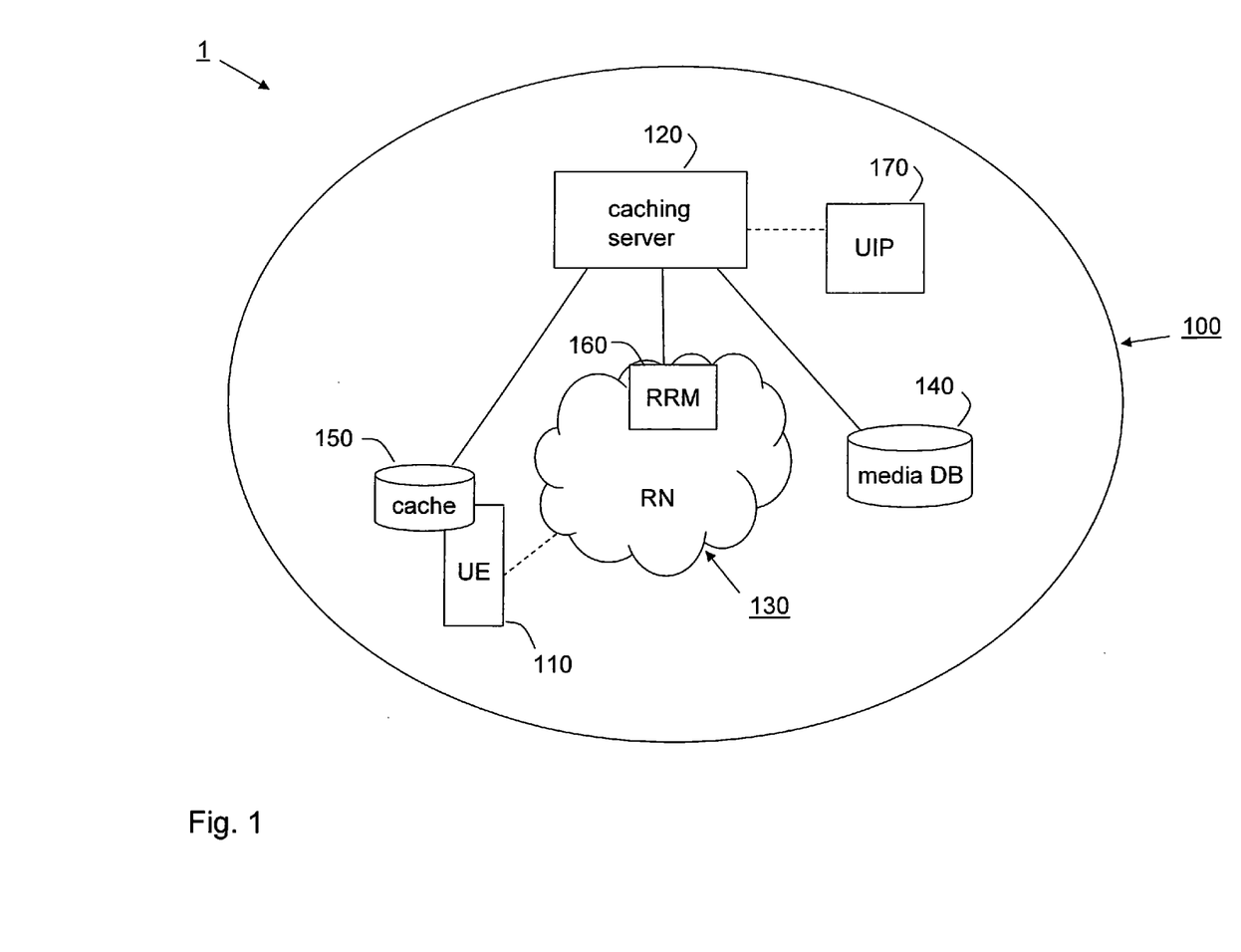
FIG. 1 is a block diagram schematically illustrating a telecommunications system in which embodiments described herein may be implemented.

FIG. 1 illustrates an exemplary telecommunications system 1 in which embodiments of the present invention may be implemented. The telecommunications system 1 includes a mobile telecommunications network 100 wherein a UE 110 is connected to a radio access network, hereinafter referred to as radio network 130.

The UE 110 communicates with a caching server 120, which in turn communicates with a media database 140. The caching server 120 selects the media file of which a portion is to be cached in the UE 110 from the media data base 140. The UE 110 includes a cache 150, wherein the portion of the media file is cached.

The caching server 120 receives, according to certain embodiments, input from the radio network 130, related to radio network conditions for the UE 110, which is used for determining the size of the portion of the media file to be cached. The radio network 130 includes a radio resource management function (RRM) 160, which controls radio transmission characteristics in the radio network 130. The RRM 160 involves strategies and algorithms for controlling parameters such as transmit power, channel allocation, data rates, handover criteria, modulation scheme, error coding scheme, etc. The RRM 160 may be implemented in an enhanced Node-B (eNodeB), Mobility Management Entity (MME), Base Station Controller (BSC) or Radio Network Controller (RNC), not shown in FIG. 1. How the input from the radio network is used for determining the size of the portion of the media file to be cached will be further explained below.

Additionally, the caching server 120 receives, according to alternative embodiments, input from a user interest prediction function (UIP) 170, which is used for determining the size of the portion of the media file to be cached. Alternatively or additionally the caching server 120 uses the input from the UIP 170 for selecting the media file of which a portion is to be cached in the UE 110. How the input from the UIP 170 is used according to these embodiments will be further explained below in connection with the description of FIG. 4.

Figure 2:
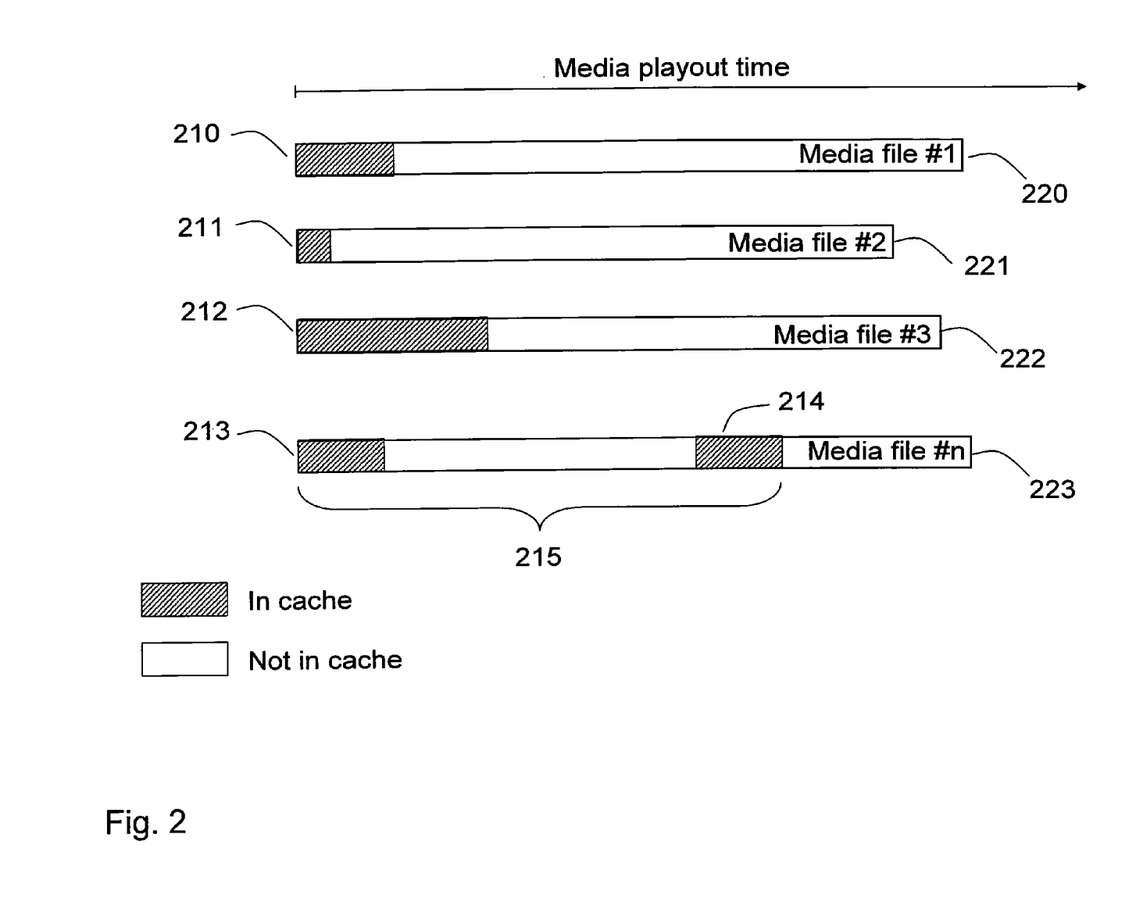
FIG. 2 is a block diagram schematically illustrating a cache of a User Equipment (UE) in accordance with certain embodiments.

FIG. 2 schematically illustrates the cache 150 of the UE 110 including a set of media files 220, 221 and 222, of which portions 210, 211 and 212, of various sizes, has been cached. As special cases, the cache 150 can contain other parts of the media file, or the full file.

Parts of a portion may be cached in different ways, depending on what data transfer protocol is employed. For a media file 223 it has, as an example, been decided to cache a portion 215, which has been split into smaller, independently, transferred parts. Parts 213 and 214 are already cached, but the remaining parts of portion 215 have not been cached yet. This is a possible scenario for example with P2P protocols such as BitTorrent.

Figure 3:
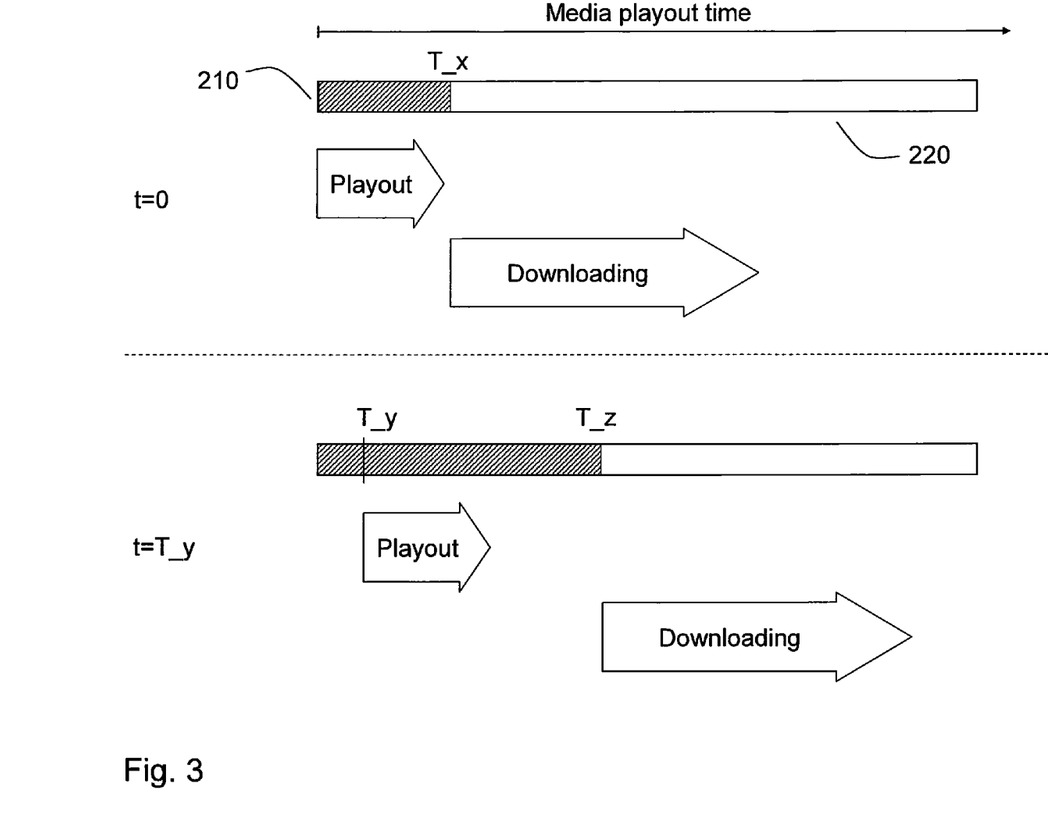
FIG. 3 is a block diagram schematically illustrating playout of a media file from a cache of a UE, in accordance with certain embodiments.

FIG. 3 schematically illustrates playout of the media file 220 from the cache 150, according to certain embodiments. When the user selects the media file to be played, it will be played from the cache 150 if it is cached there. The portion 210 corresponding to the first T_x seconds of the media file 220 has been cached at some point in time before t=0 time. When the user starts the media file 220 at t=0 and the playout starts from the beginning of the media file 220, another process is started, to download the media file 220 from time T_x. After T_y seconds, if the user did not pause or scroll, the media file 220 is played out at T_y time, while the downloading process has advanced to T_z.

However, if the download speed is insufficient, or there are temporary connectivity problems between the UE 110 and the caching server 120, then the playout can "catch up" with the download. This means that the playback can come to a point in the media file that is missing from the cache 150. At this point, the playout has to be paused until the download process acquires the necessary content and fills up the cache 150 with a few seconds of the media file again. This process is called "rebuffering". During this process, the image shown to the user is paused or frozen, which is undesirable.

A procedure for caching a portion of a media file in the UE 110, in accordance with certain embodiments, will now be described. The caching server 120 determines, according to these embodiments, the size of the portion of the media file to be cached depending on radio network conditions for the UE 110.

In this way user experience is improved since it is ensured that a sufficient amount of the media file is cached, given the radio network conditions. Since the radio network conditions influences download speed and connectivity, rebuffering is avoided, since the cached amount is adapted to the available download speed and connectivity. This also improves prefetching since it is avoided that a too large portion is cached in relation to the radio network conditions.

The radio network conditions may be selected from radio resource factors or from other factors, such as an indicator indicating a movement of the UE 110.

The radio resource factors may be RRM parameters chosen from the 3rd Generation Partnership Project (3GPP) Technical Specification (TS) 36.133, which describe RRM requirements for Long Term Evolution (LTE); or from 3GPP TS 25.123 and, which defines these requirements for Universal Terrestrial Radio Access Network (UTRAN)/Wideband Code Division Multiple Access (WCDMA) networks.

The radio resource factor takes, according to certain embodiments, into account an amount of radio resources that can be allocated at a location where the UE 110 is located when the caching of the portion of the media file starts. Note that, in FIG. 3, described above, this point of time is before t=0. The radio resource factor may be adjusted with a prediction factor that predicts the amount of radio resources expected to be available for the duration of the caching of the portion 210 of the media file 220. In this way it is possible to take changing radio conditions during the caching into consideration. In a situation of network congestion during the caching, the size of the portion to be cached should be set to zero during the period of network congestion, in order to not cause additional load to the network.

Alternatively, according to some embodiments, the radio resource factor may be adjusted with a prediction factor that predicts the amount of radio resources expected to be available for the duration of the playout of the media file 220. In this way it is possible to adapt the cached portion to the circumstances when the media file is accessed. As an example, if the user normally accesses media files early in the mornings, on his/her way to work and the radio network is heavily loaded at that point in time then a large amount of the media file is cached in advance. This ensures a good user experience when accessing the media file, even if the network is heavily loaded.

As mentioned above, the radio network conditions may alternatively be selected from other factors, such as an indicator indicating a movement of the UE 110. The indicator may detect movement of the UE by e.g. receiving input from an accelerometer in the UE or by detecting that the UE has performed hand-over or a location update procedure recently. The possibility to detect that the UE is moving when the decision about caching is being made, provides for that an operator might impose harder limits on the size of the portion to be cached, since it is difficult to predict whether idle resources would be available all around the path that the UE follows through the area of coverage.

It will now be described how the size of the portion of the media file to be cached is determined depending on characteristics of the media file. Going back to FIG. 2, the media files 220, 221, 222 and 223 are associated with various characteristics, such as a codec type or a video resolution.

According to some embodiments, the codec type is used for determining the size of the portion of the media file to be cached. Depending on the codec type, more or less bandwidth is needed for assuring a good quality of experience for the user. One might choose to transfer a multiple of a standard decoder buffer length for a given codec in order to ensure that the quality of experience of the user does not suffer while the network is transferring the remainder of the media file.

Alternatively or additionally, the video resolution is used for determining the size of the portion of the media file to be cached. The wider the resolution, the bigger the size of the media file and the higher the rate with which the data needs to reach the decoder. For example, a High-definition (HD) media file played over a mobile network might stop several times just because the network cannot offer enough bandwidth for the data transfer. But if the network manages to make most of the transfer before the actual playout starts then the number of stops will be reduced or eliminated.

Thus, by adapting the size of the portion of the media file to be cached based on the characteristics of the media file, it is more likely that the cached amount of the media file is sufficient to give the user an improved experience when accessing the media file.

Figure 4:
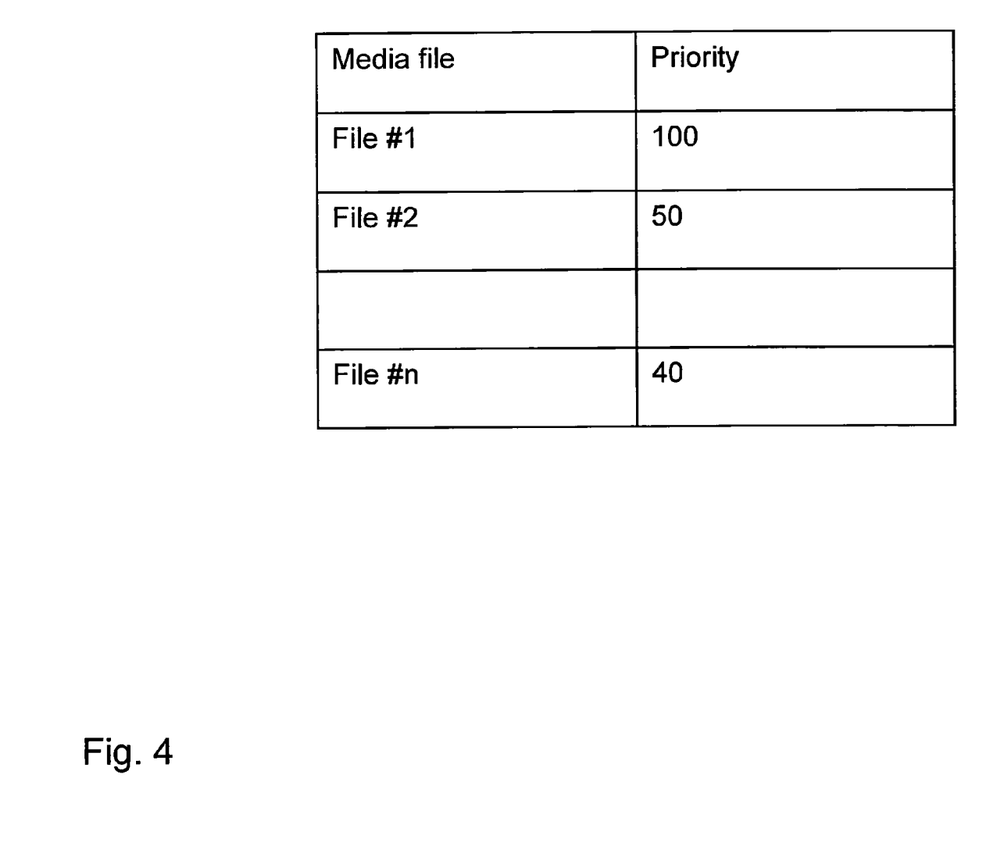
FIG. 4 is an exemplary table including an estimated priority factor, in accordance with certain embodiments.

A procedure for caching a portion of a media file in the UE 110, in accordance with certain embodiments, will now be described with reference to the block diagram shown in FIG. 4, illustrating a table including an estimated priority factor. The estimated priority factor reflects the predicted likelihood that a media file will be requested by the UE 110. The caching server 120 determines, according to these embodiments, the size of the portion of the media file to be cached depending on the estimated priority factor, i.e. on input from the user interest prediction function, UIP 170.

The estimated priority factor could be calculated in a similar way as described in previously mentioned WO 2011/075019 A1. For example, any algorithm similar to page ranking (as used by search engines such as Google) counting the number of links or references to a particular piece of content can be used. Such algorithm can be applied to a subset of users of UEs determined either given a particular geographical area, or from the social graph associated to the user of the UE. The higher the estimated priority factor, the larger the size of the portion of the media file can be cached. The size may be limited to a maximum size based on a policy decision. The policy decision may be personalised for each user or group of users.

By adapting the size of the cached portion of the media file to the predicted likelihood that the media file will be requested, or accessed by the UE, it is ensured that large portions only are cached only when it is really motivated, i.e. when it is likely that the user will access the media file. If it is less likely that the media file will be accessed, then it may be cached in a very small portion, or not at all, thus improving the use of resources and capacity.

Alternatively or additionally, according to some embodiments, the caching server 120 selects the media file of which a portion is to be cached in the UE 110, based on the estimated priority factor. That is, only a media file ranked as having a high probability of being accessed by the user, is selected. In this way, prefetching is improved since unnecessary storage of portions of media files with a low likelihood to be accessed is avoided.

As yet an alternative the media file may be selected based on preferences associated with the UE 110, i.e. with the user of UE 110. As an example, a user having a Facebook account may indicate that he or she likes a certain media file, or other content. Preferences associated with the UE may be a list of Facebook "likes". It may also be any kind of list associated with the user, e.g. Spotify lists.

Basing the selection of the media file on preferences associated with the UE provides for that only portions of media files of high interest to the user is cached, i.e. media files with a high likelihood to be accessed.

Figure 5:
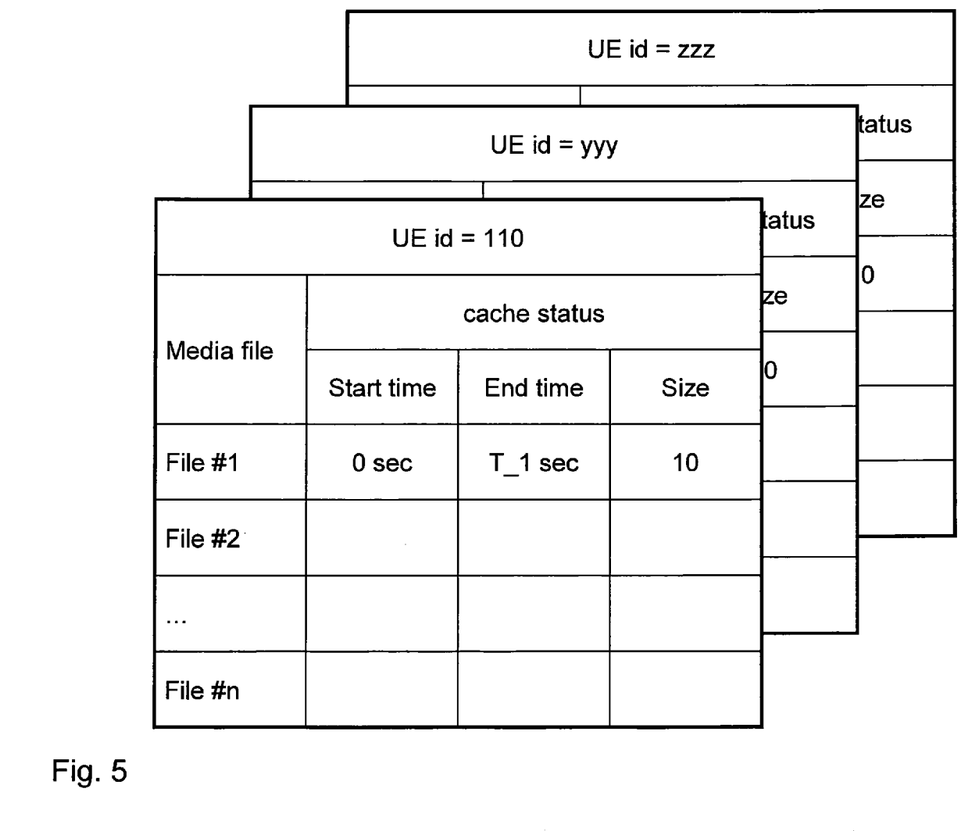
FIG. 5 is an exemplary UE cache status table maintained in the caching server, in accordance with certain embodiments.

FIG. 5 illustrates how the caching server 120 maintains status information for the cache 150 of UE 110, but also for the caches of other UE's, not shown in FIG. 1. The status information is maintained in a status table. In this example, each media file has only one portion cached, but in principle it is possible that the cache 150 stores multiple portions for a media file and each of these appear in the status table.

It has been explained above how the caching server 120 selects the media file and determines the size of the portion of the media file depending on different criteria. The caching server then sends an instruction to the UE 110 to cache the determined size of the portion of the media file in the UE 110.

Alternatively, according to certain embodiments, before sending the instruction to the UE 110 to cache the portion of the media file, the caching server 120 determines that radio network conditions are suitable for caching. The determination may be based on the factors mentioned above in connection with the description of the radio network conditions. The instruction is sent only if the radio network conditions are suitable for caching. In this way it is possible to avoid caching in periods when the radio network conditions are less suitable for caching.

According to some embodiments, the caching server 120 sends the instruction to an external application, running on the UE 110, to cache the determined size of the portion of the media file in the UE 110. Such situation arises when the caching server 120 by itself has no access to the media file. However, the external application has access to the media file and part of the cache 150 is used exclusively by the external application An example of such application-specific cache is covered by the offline functionality of Spotify or similar applications. In this case, the caching server 120 cannot access the media resources directly. However, it can signal the external application that radio resources are available for caching. Optionally, the input from the above discussed UIP 170 could integrate information on user preferences made available by the external application. In case such input is not available, the caching server 120 may establish how much resources can be allocated to a particular UE, depending on the operator's policy, and make this value available to the external application. As yet another option, the caching server 120 could verify whether a certain external application is authorized by the operator to use idle resources for prefetching purposes and withhold signaling the resource availability, in case the application is not authorized. This would allow the mobile operator additional opportunities to monetize the capacity of its network.

A flow chart schematically illustrating a method in the caching server 120, for caching a portion of a media file in the UE 110, in accordance with embodiments of the invention, will now be described with reference to FIG. 6.

Figure 6:
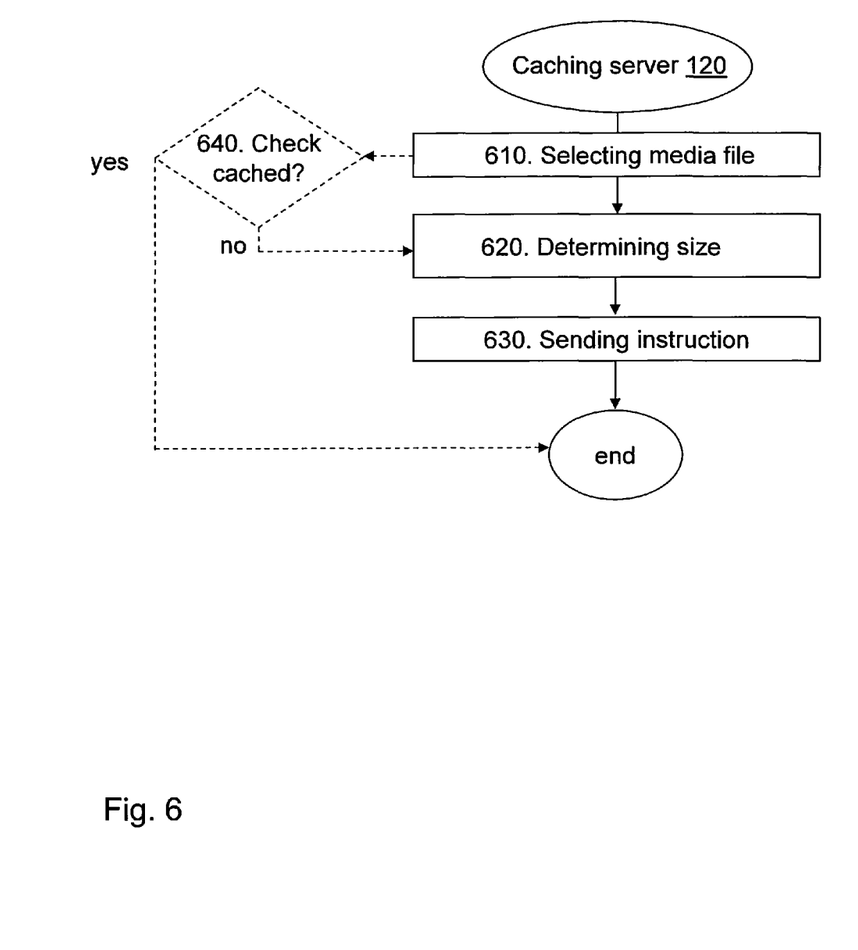
FIG. 6 is a flow chart schematically illustrating an embodiment of a method in a caching server for enabling caching of a portion of a media file in a UE.

Steps indicated by reference numerals 610-640 respectively in FIG. 6 are explained below. In a step 610, the caching server 120 selects a media file of which a portion is to be cached in the UE 110. The caching server 120 determines, in a step 620, a size of the portion of the media file to be cached. The size is determined depending on radio network conditions and/or characteristics of the media file. In a step 630, the caching server 120 sends an instruction to the UE 110 to cache the determined size of the portion of the media file in the UE 110.

In an optional step 640, the caching server checks whether the portion of the media file is previously cached in the UE 110. If the portion is previously stored the method ends. If the portion is not previously stored the method proceeds to the next step. Step 640 may be performed after step 610. Alternatively, step 640 may be performed after step 620 or after step 630.

Figure 7:
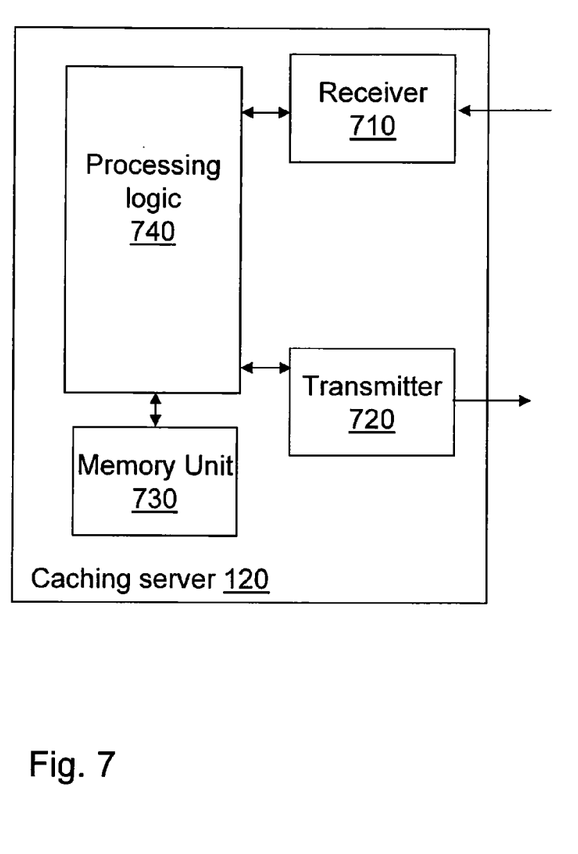
FIG. 7 is a block diagram schematically illustrating a caching server, in accordance with certain embodiments.

FIG. 7 is a schematic block diagram of the caching server 120 adapted to execute the method described in connection with FIG. 6. As illustrated, the caching server 120 comprises a receiver 710, a transmitter 720, a memory unit 730 and processing logic 740.

The receiver 710 and the transmitter 720 may comprise circuitry that allows the caching server 120 to communicate with other nodes. The processing logic 740 may control the operation of the caching server 120.

In particular, the processing logic 740 is configured to select the media file of which a portion is to be cached in the UE 110, according to the step 610, discussed above. Further, the processing logic 740 is configured determine the size of the portion of the media file to be cached, wherein the size is determined depending on radio network conditions for the UE and/or characteristics of the media, according to the step 620 discussed above. The transmitter 720 is configured to send the instruction to the UE 110 to cache the portion 210 of the media file 220, according to the step 630 discussed above.

The processing logic 740 can be a single unit or a plurality of units configured to perform different steps of procedures described herein. The receiver 710 and the transmitter 720 may be arranged as one in a combined transceiver in the hardware of the caching server 120. The memory unit 730 may store the tables illustrated in FIGS. 4 and 5.

Furthermore the caching server 120 may comprise at least one, not shown, computer program product in the form of a volatile or non-volatile memory, e.g. an EEPROM, a flash memory and a disk drive. The computer program product may comprise a computer program, which comprises code means which when run on the caching server 120 causes the caching server 120 to perform the steps of the procedure described earlier in conjunction with FIG. 6. In alternative embodiments, at least one of the code means may be implemented at least partly as hardware circuits.

The skilled person realizes that the actual calculation of the size of the portion of the media file to be cached could be performed in numerous ways. As an example the size can be calculated as a function of factors that influences bandwidth requirements, such as the codec type or the video resolution, described above. Additionally or alternatively, the size can be calculated as a function of factors that influences the buffer playout time, such as the estimated priority factor, the moving UE indicator or the radio resources factor, all of which are described above.

As an example, a formula such as the following may be used for the calculation of the size, s, of the portion of the media file to be cached:

$$s=k*f(mc)*g(mfc)*epf$$

where:
k is a constant set by an operator, e.g. x seconds or y bytes;
f(mc) is a function based on the radio network conditions and can be further defined as:

$$f(mc)=q1*f1(rr(pr1,pr2))*mi$$

where:
q1=constant;
rr=radio resources factor;
pr1=prediction factor that predicts the amount of radio resources expected to be available for the duration of the caching of the media file;
pr2=prediction factor that predicts the amount of radio resources expected to be available for the duration of the playout of the media file; and
mi=moving UE indicator;
g(mfc) is a function based on the media file characteristics and can be further defined as:

$$g(mfc)=q2*g1(ct,vr)$$

where:
q2=constant;
ct=codec type; and
vr=video resolution; and
epf is the estimated priority factor.
If only mc is taken into consideration then g(mfc)=1.
If only mcf is taken into consideration then f(mc)=1.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for enabling caching of a portion of a media file in a User Equipment (UE) performed by a caching server of a mobile telecommunications network, the method comprising the steps of:
   selecting the media file of which a portion is to be cached in the UE;
   determining a size of the portion of the media file to be cached, wherein the size is determined depending on radio network conditions for the UE or characteristics of the media file; and
   sending an instruction to the UE to cache the determined size of the portion of the media file in the UE;
   wherein the step of sending an instruction to the UE to cache the determined size of the portion of the media file in the UE includes sending the instruction to an external application, and
   wherein the step of sending the instruction to an external application includes:
      verifying whether the external application is authorized to use idle resources for caching;
      when the external application is authorized, sending the instruction to the external application; and
      when the external application is not authorized, withholding the instruction from the external application.

2. The method according to claim 1, wherein the radio network conditions for the UE include a radio resources factor, the radio resources factor being based on an amount of radio resources that can be allocated at a location where the UE is located when the caching of the portion of the media file starts.

3. The method according to claim 2, wherein the radio resources factor is adjusted with a prediction factor, the prediction factor being based on an amount of radio resources expected to be available for a duration of the caching of the portion of the media file.

4. The method according to claim 2, wherein the radio resources factor is adjusted with a prediction factor, the prediction factor being based on an amount of radio resources expected to be available for a duration of a playout of the media file.

5. The method according to claim 1, wherein the radio network conditions for the UE include an indicator indicating a movement of the UE.

6. The method according to claim 1, wherein the characteristics of the media file include a codec type or a video resolution for the media file.

7. The method according to claim 1, wherein the size of the portion of the media file to be cached is determined depending on an estimated priority factor reflecting a predicted likelihood that the media file will be requested by the UE.

8. The method according to claim 1, wherein the step of selecting the media file of which the portion is to be cached in the UE includes selecting the media file based on an estimated priority factor reflecting a predicted likelihood that the media file will be requested by the UE.

9. The method according to claim 1, wherein the step of selecting the media file of which the portion is to be cached in the UE includes selecting the media file based on preferences associated with the UE.

10. The method according to claim 1, further comprising determining whether the portion of the media file is previously cached in the UE.

11. The method according to claim 1, wherein the step of sending an instruction to the UE to cache the determined size of the portion of the media file in the UE includes:
   determining that radio network conditions are suitable for caching; and
   sending the instruction to the UE to cache the portion of the media file if the radio network conditions are suitable for caching.

12. A caching server of a mobile telecommunications network, the caching server being configured for enabling caching of a portion of a media file in a User Equipment (UE), wherein the caching server comprises:
   processing logic configured to select the media file of which a portion is to be cached in the UE, and to determine a size of the portion of the media file to be cached, wherein the size is determined depending on radio network conditions for the UE or characteristics of the media file;
   a receiver configured to receive information regarding the radio network conditions for the UE or the characteristics of the media file; and
   a transmitter configured to send an instruction to the UE to cache the determined size of the portion of the media file in the UE;
   wherein the caching server verifies whether an external application is authorized to use idle resources for caching;

wherein when the external application is authorized, the transmitter sends the instruction to the external application; and wherein when the external application is not authorized, the transmitter withholds the instruction from the external application.

13. The caching server according to claim 12, further comprising a memory unit connected to the processing logic and configured to store one or more of:

information relating to a status of the UE cache;

an estimated priority factor reflecting a predicted likelihood that the media file will be requested by the UE; and UE media file preferences.

* * * * *